US006209566B1

(12) United States Patent
Burdock

(10) Patent No.: US 6,209,566 B1
(45) Date of Patent: Apr. 3, 2001

(54) HYDRAULIC CONTROL SYSTEMS

(75) Inventor: William Burdock, Sutton Coldfield (GB)

(73) Assignee: Rover Group Limited, Warwick (GB)

( * ) Notice: Subject to any disclaimer, the term of this patent is extended or adjusted under 35 U.S.C. 154(b) by 0 days.

(21) Appl. No.: 09/320,068

(22) Filed: May 26, 1999

(30) Foreign Application Priority Data

Jun. 9, 1998 (GB) .................................................. 9812305

(51) Int. Cl.$^{7}$ ....................................................... G01K 7/00

(52) U.S. Cl. ...................................... 137/115.25; 361/160

(58) Field of Search ........................ 137/115.25; 361/160

(56) References Cited

U.S. PATENT DOCUMENTS 4,083,001 4/1978 Paice .................................... 324/158
5,645,352 7/1997 Menten ............................... 374/183

FOREIGN PATENT DOCUMENTS 2 165 649 4/1986 (GB) .

*Primary Examiner*—John Fox
(74) *Attorney, Agent, or Firm*—Davis and Bujold

(57) ABSTRACT

A hydraulic actuator for a vehicle roll control system includes a fluid pressure transducer 28, housed in a valve block 16, the output characteristic of which is temperature dependent. In order to correct for this the temperature of the fluid is monitored. This is done by monitoring the duty ratio of the pulse width modulated driving signal to a control valve 22 in the block, which varies with temperature to produce a constant total current.

6 Claims, 2 Drawing Sheets

HYDRAULIC CONTROL SYSTEMS

FIELD OF THE INVENTION

The present invention relates to hydraulic control systems such as those used in the control of vehicle active suspension systems.

BACKGROUND OF THE INVENTION

It is known to provide closed loop pressure control in a hydraulic system by monitoring the hydraulic pressure at a point in a hydraulic circuit, comparing the measured pressure with a desired pressure, and controlling the electrical current to an electrically operated valve, such as a solenoid valve, to open or close the valve to adjust the pressure in the system towards the desired pressure.

It can be a problem with such systems that known pressure transducers have a temperature dependent characteristic, so the exact hydraulic pressure cannot be accurately measured.

SUMMARY OF THE INVENTION

The present invention provides a control system for a hydraulic valve block including an electrically operated valve, the system including an electronic control means arranged to supply an electric control current to the valve, the control current having a temperature dependent parameter, and the control means being further arranged to monitor said parameter thereby to measure the temperature of the valve.

The present invention further provides a hydraulic control system comprising a hydraulic circuit containing fluid and including a source of fluid pressure, an electrically operated valve for controlling the fluid pressure in a part of the hydraulic circuit, a pressure transducer for producing a pressure signal indicative of the fluid pressure in said part of the hydraulic circuit, and an electronic control means arranged to supply an electric control current to the valve to control the valve in response to signals from the pressure transducer, the control current having a temperature dependent parameter wherein the control unit is also arranged to monitor said parameter of the control current thereby to monitor the temperature of the valve, and to compensate accordingly for the effect of temperature changes on the pressure signal.

Preferred embodiments of the present invention will now be described by way of example only with reference to the accompanying drawings.

DESCRIPTION OF THE PREFERRED EMBODIMENTS OF THE INVENTION

Figure 1:
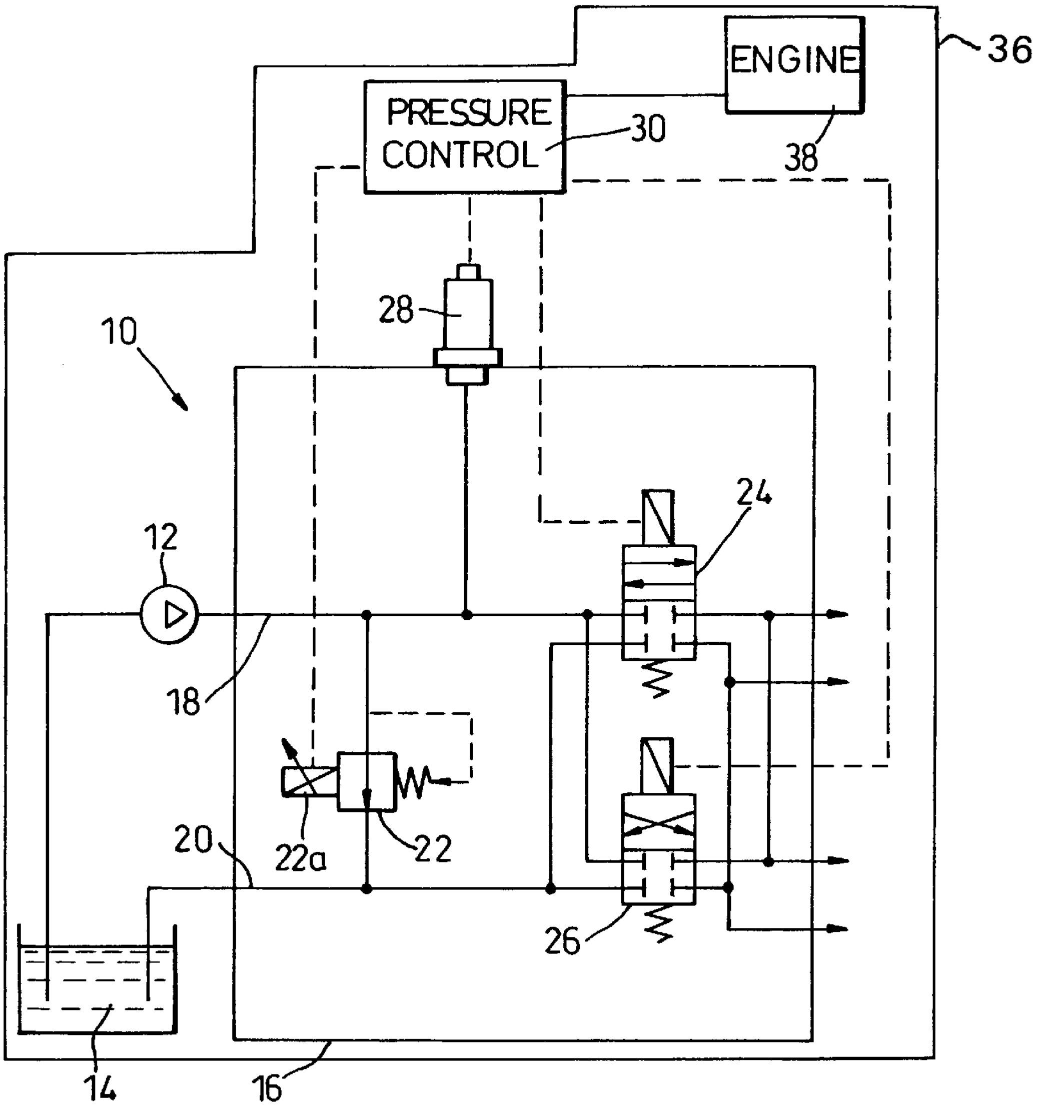
FIG. 1 is a diagrammatic representation of a hydraulic control system according to the invention.

Referring to FIG. 1, a hydraulic circuit 10 for an active vehicle suspension system comprises a pump 12 for supplying hydraulic fluid under pressure from a reservoir 14, and a valve block 16 for controlling the distribution of hydraulic fluid to various actuators (not shown) and the return of fluid to the reservoir 14. The valve block has a first port 18 for receiving fluid from the pump 12 and a second port 20 for the return of fluid to the reservoir 14. The first and second ports 18, 20 are interconnected by a diverter valve 22 which can allow fluid to flow from the first port 18 to the second port 20 to control the pressure at the first port as will be described in more detail below. Two further solenoid valves 24, 26 control the flow of fluid from the pump 12 to the actuators and from the actuators to the reservoir. These two valves basically connect and disconnect the actuators in the desired combination, and details of their operation are not relevant to this invention. A pressure transducer 28 produces a pressure signal indicative of the hydraulic pressure at the first port 18, and a control unit controls the valves 22, 24, 26 in response to the pressure signal so as to regulate the pressure at the first port 18 to a desired level, and to connect the actuators to the first and second ports 18 20 in the desired combination. The choice of pressure produced by the diverter valve 22 is based on other inputs to the control unit 30 which are not relevant to this invention.

Figure 2:
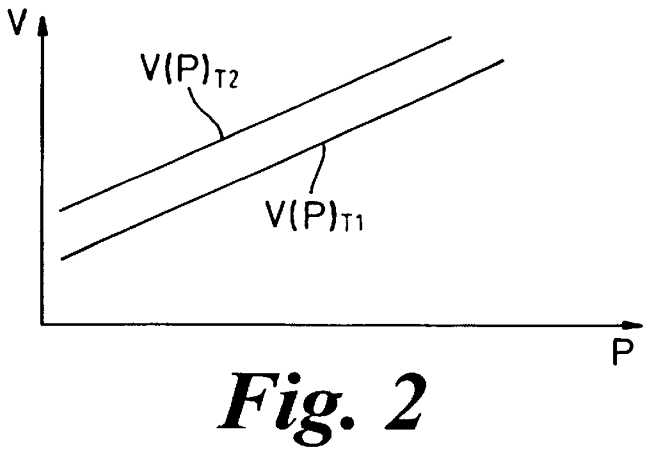
FIG. 2 shows the output characteristic of the pressure transducer forming part of the system of FIG. 1.

Referring to FIG. 2, the output characteristic of the pressure transducer 28 is dependent on its temperature. At a given temperature, the 10 voltage output by the transducer is directly related to the pressure being measured. As the temperature changes, the gradient of the characteristic, i.e. the change in output voltage for a given change of pressure is the same, but the absolute value of the output voltage is altered. Thus for a first low temperature T1, the characteristic is illustrated by the line $V(P)_{T1}$, and for a second, higher temperature T2 the characteristic is illustrated by the line $VP)_{T2}$. The output voltage for zero pressure is referred to as the offset voltage, and the change in offset voltage with temperature is the same as the change in output voltage with temperature for any given pressure.

Figure 3:
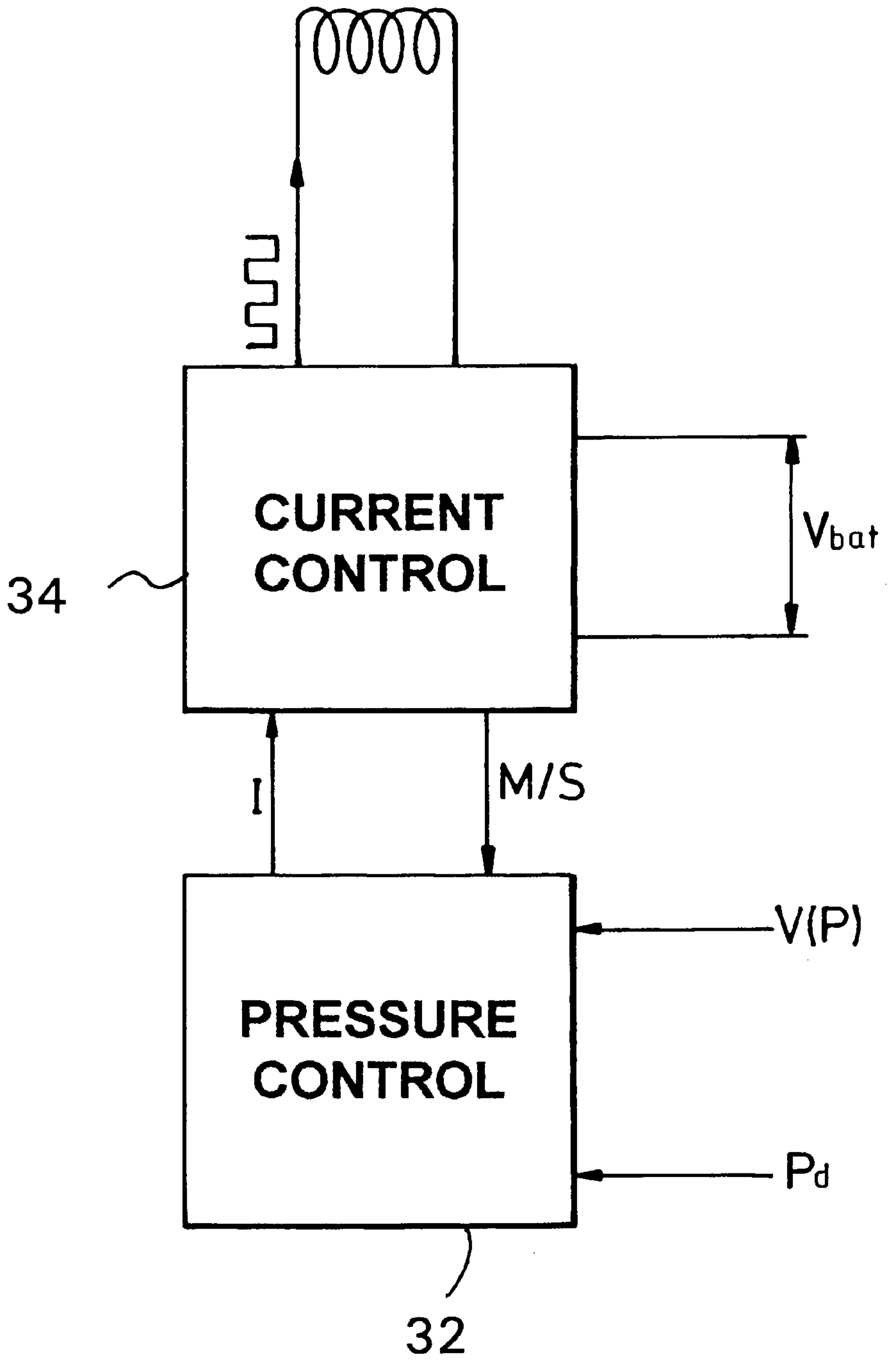
FIG. 3 is a diagrammatic representation of the control unit.

Referring to FIG. 3, the control unit can be considered as a number of 20 functional blocks. A pressure control block 32 receives a signal $P_d$ indicative of the desired pressure at the first port 18 and another signal V(P) which is the output signal from the pressure transducer. From the difference between the measured pressure and the desired pressure it produces a signal I which indicates the current which needs to be supplied to the solenoid 22*a* of the diverter valve 22 to produce the desired pressure at the first port 18.

A current control block 34 receives the signal I and also has inputs connected to a battery voltage $V_{bat}$. It applies the battery voltage across the solenoid 22*a* as a pulsed signal, monitors the driving current flowing through the solenoid as a result, and modulates the pulse width so as to produce the total, or mean, current corresponding to the signal I from the pressure control block. The current control block sends a signal M/S back to the pressure control block indicative of the mark to space (or duty) ratio of the driving current.

Because the electrical resistance of the solenoid 22*a* is temperature dependent, the duty ratio of the solenoid driving current required to produce a given total current varies with the temperature of the solenoid. Therefore, because the valve block is a good thermal conductor, and the temperature of the pressure transducer 28 will always be approximately equal to that of the solenoid 22*a*, the pressure control block can determine the temperature of the pressure transducer from the relationship between the signal I and the signal M/S.

Referring back to FIG. 2, in order to determine the pressure P corresponding to a transducer output voltage V, the control unit needs to know the gradient of the voltage/pressure characteristic, which is constant and can be stored in memory, and the offset voltage which is the output voltage at zero pressure. It is assumed that the offset voltage varies linearly with temperature, and the control unit is therefore arranged to record the output voltage V at a time when the temperature of the vehicle 36 is low, e.g. when it is started up, and at another time when the temperature of the vehicle 36 is high, e.g. when the engine 38 is turned off. From estimates of the temperatures at these times the relationship between offset voltage and temperature can be estimated.

I claim:

1. A hydraulic control system comprising a hydraulic circuit containing fluid and including a source of fluid pressure, an electrically operated valve for controlling the fluid pressure in a part of the hydraulic circuit, a pressure transducer for producing a pressure signal indicative of the fluid pressure in said part of the hydraulic circuit, and an electronic control means for supplying an electric control current to the electrically operated valve to control the electrically operated valve in response to signals from the pressure transducer, and the control current having a temperature dependent parameter;

wherein the control means is also arranged to monitor said parameter of the control current thereby to monitor the temperature of the electrically operated valve, and to compensate accordingly for an effect of temperature changes on the pressure signal, the pressure transducer has an output voltage which is temperature dependent and the control means is arranged to calibrate its temperature dependence by monitoring its output voltage at times when the fluid pressure to be measured is at a known level and the temperature is at each of at least two levels.

2. The hydraulic control system according to claim 1, wherein the hydraulic control system is incorporated in a vehicle which has an engine.

3. The hydraulic control system according to claim 2, wherein one of said times is when the engine of the vehicle is started up.

4. The hydraulic control system according to claim 2, wherein one of said times is when the engine of the vehicle is turned off.

5. A hydraulic control system comprising a hydraulic circuit containing fluid and including a source of fluid pressure, an electrically operated valve coupled to the source of fluid pressure for controlling the fluid pressure in a part of the hydraulic circuit, a pressure transducer coupled to the source of fluid pressure for producing a pressure signal indicative of the fluid pressure in said part of the hydraulic circuit, and an electronic controller for supplying an electric control current to the electrically operated valve to control the electrically operated valve in response to signals from the pressure transducer, and the control current having a temperature dependent parameter;

wherein the controller is also arranged to monitor said parameter of the control current and thereby monitor the temperature of the electrically operated valve, and to compensate accordingly for an effect of temperature changes on the pressure signal, the pressure transducer has an output voltage which is temperature dependent and the electronic controller is arranged to calibrate the temperature dependence by monitoring the output voltage at times when the fluid pressure to be measured is at a known level and the temperature is at each of at least two levels.

6. A hydraulic control system comprising a hydraulic circuit containing a reservoir, a pump coupled to the hydraulic circuit via a first port for supplying fluid pressure to the hydraulic circuit and a second port coupled to the reservoir for returning fluid pressure from the hydraulic circuit, an electrically operated valve coupled to the first and second ports for controlling the fluid pressure in a part of the hydraulic circuit, a pressure transducer coupled to the first port for producing a pressure signal indicative of the fluid pressure in said part of the hydraulic circuit, and an electronic controller for supplying an electric control current to the electrically operated valve to control the electrically operated valve in response to signals from the pressure transducer, and the control current having a temperature dependent parameter;

wherein the controller is also arranged to monitor said parameter of the control current and thereby monitor the temperature of the electrically operated valve, and to compensate accordingly for an effect of temperature changes on the pressure signal, the pressure transducer has an output voltage which is temperature dependent and the electronic controller is arranged to calibrate the temperature dependence of the pressure transducer by monitoring the output voltage of the pressure transducer at times when the fluid pressure to be measured is at a known level and the temperature is at each of at least two levels.

* * * * *